(12) United States Patent
Matsuoka et al.

(10) Patent No.: US 9,876,449 B2
(45) Date of Patent: Jan. 23, 2018

(54) DRIVE CIRCUIT FOR SYNCHRONOUS MOTOR, SYNCHRONOUS MOTOR DRIVEN BY DRIVE CIRCUIT, AIR BLOWER INCLUDING SYNCHRONOUS MOTOR, AIR CONDITIONER INCLUDING AIR BLOWER, AND METHOD OF DRIVING SYNCHRONOUS MOTOR

(71) Applicant: Mitsubishi Electric Corporation, Tokyo (JP)

(72) Inventors: Atsushi Matsuoka, Tokyo (JP); Kazuhiko Baba, Tokyo (JP); Hiroyuki Ishii, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/110,142

(22) PCT Filed: Jan. 9, 2014

(86) PCT No.: PCT/JP2014/050253
§ 371 (c)(1),
(2) Date: Jul. 7, 2016

(87) PCT Pub. No.: WO2015/104821
PCT Pub. Date: Jul. 16, 2015

(65) Prior Publication Data
US 2016/0336884 A1 Nov. 17, 2016

(51) Int. Cl.
*H02P 6/10* (2006.01)
*H02P 6/08* (2016.01)
(Continued)

(52) U.S. Cl.
CPC .............. *H02P 6/10* (2013.01); *F04D 19/002* (2013.01); *F04D 25/06* (2013.01); *F04D 27/004* (2013.01);
(Continued)

(58) Field of Classification Search
CPC ...... F04D 19/002; F04D 25/06; F04D 27/004; F04D 29/661; H02P 6/10; H02P 6/15;
(Continued)

(56) References Cited

U.S. PATENT DOCUMENTS 5,138,244 A * 8/1992 Bahn ..................... H02P 25/089
                                                318/400.13
6,984,909 B2 * 1/2006 Kadoya ................... H02K 1/146
                                                310/185
(Continued)

FOREIGN PATENT DOCUMENTS

JP S62-110468 A 5/1987
JP H09-172762 A 6/1997
(Continued)

OTHER PUBLICATIONS

International Search Report of the International Searching Authority dated Mar. 18, 2014 for the corresponding international application No. PCT/JP2014/050253 (and English translation).
(Continued)

*Primary Examiner* — Rita Leykin
(74) *Attorney, Agent, or Firm* — Posz Law Group, PLC

(57) ABSTRACT

A drive circuit for a synchronous motor including a rotor having ten magnetic poles formed by a permanent magnet, and a stator in which a winding is wound in a concentrated manner around nine teeth facing the rotor, the drive circuit including: an inverter including a plurality of switching elements in bridge connection; and a control unit that controls the inverter in such a manner that a square-wave-
(Continued)

shaped current flows to the winding, wherein the control unit operates in such a manner that an energization phase at which to pass the square-wave-shaped current falls within a range of electric angles of −10° to +5° from an energization phase at which the current is minimum when a target torque of the synchronous motor is generated.

6 Claims, 15 Drawing Sheets

(51) Int. Cl.
| | |
|---|---|
| F04D 19/00 | (2006.01) |
| F04D 25/06 | (2006.01) |
| F04D 27/00 | (2006.01) |
| H02K 1/14 | (2006.01) |
| H02K 1/27 | (2006.01) |
| H02P 27/08 | (2006.01) |
| H02K 29/03 | (2006.01) |
| H02K 3/28 | (2006.01) |
| H02P 6/15 | (2016.01) |
| F04D 29/66 | (2006.01) |

(52) U.S. Cl.
CPC .......... *F04D 29/661* (2013.01); *H02K 1/14* (2013.01); *H02K 1/2706* (2013.01); *H02K 3/28* (2013.01); *H02K 29/03* (2013.01); *H02P 6/085* (2013.01); *H02P 6/15* (2016.02); *H02P 27/08* (2013.01)

(58) Field of Classification Search
CPC ........ H02P 6/085; H02P 27/08; F04G 27/004; H02K 1/14; H02K 3/28; H02K 29/03
USPC ................ 318/400.29, 400.27; 363/135–139
See application file for complete search history.

(56) References Cited

U.S. PATENT DOCUMENTS

| | | | | |
|---|---|---|---|---|
| 7,116,073 | B1 * | 10/2006 | Sorkin | H02P 23/10 318/162 |
| 7,135,829 | B1 * | 11/2006 | Sorkin | H02P 25/034 318/400.07 |
| 7,155,804 | B2 * | 1/2007 | Calico | H02K 1/14 29/596 |
| 7,294,988 | B2 * | 11/2007 | Ajima | B60K 6/26 318/430 |
| 7,342,379 | B2 * | 3/2008 | Marcinkiewicz | H02P 6/18 318/431 |
| 7,583,049 | B2 * | 9/2009 | Marcinkiewicz | H02P 25/08 318/561 |
| 8,410,737 | B2 * | 4/2013 | Wu | H02P 21/0025 180/65.265 |
| 8,810,168 | B2 * | 8/2014 | Tsuji | H02P 21/0035 318/400.01 |
| 8,890,454 | B2 * | 11/2014 | De Franciscis | H02P 9/10 318/400.01 |
| 9,099,905 | B2 * | 8/2015 | Manz | H02K 1/2773 |
| 2004/0251763 | A1 * | 12/2004 | Tamaki | H02K 1/2766 310/156.53 |
| 2007/0182349 | A1 * | 8/2007 | Fujita | F02N 11/04 318/145 |
| 2010/0133940 | A1 * | 6/2010 | Grossmann | H02K 1/278 310/156.46 |
| 2010/0253250 | A1 * | 10/2010 | Marvelly | H02P 6/085 318/3 |
| 2016/0006301 | A1 * | 1/2016 | Matsuoka | H02K 21/16 310/216.112 |
| 2016/0172949 | A1 * | 6/2016 | Matsuoka | H02K 21/16 310/195 |

FOREIGN PATENT DOCUMENTS

| | | | | |
|---|---|---|---|---|
| JP | 2005-102475 | A | 4/2005 | |
| JP | 2007259541 | A * | 4/2007 | ............. H02K 3/18 |
| JP | 2007-189808 | A | 7/2007 | |
| JP | 2007-259541 | A | 10/2007 | |
| JP | 2010-239767 | A | 10/2010 | |

OTHER PUBLICATIONS

Office Action dated May 9, 2017 issued in corresponding JP patent application No. 2015-556679 (and partial English translation).

* cited by examiner

| NUMBER OF POLES | 8 | 10 | 8 | 10 |
|---|---|---|---|---|
| NUMBER OF SLOTS | 12 | 12 | 9 | 9 |
| WINDING FACTOR | 0.866 | 0.933 | 0.945 | 0.945 |

FIG.19
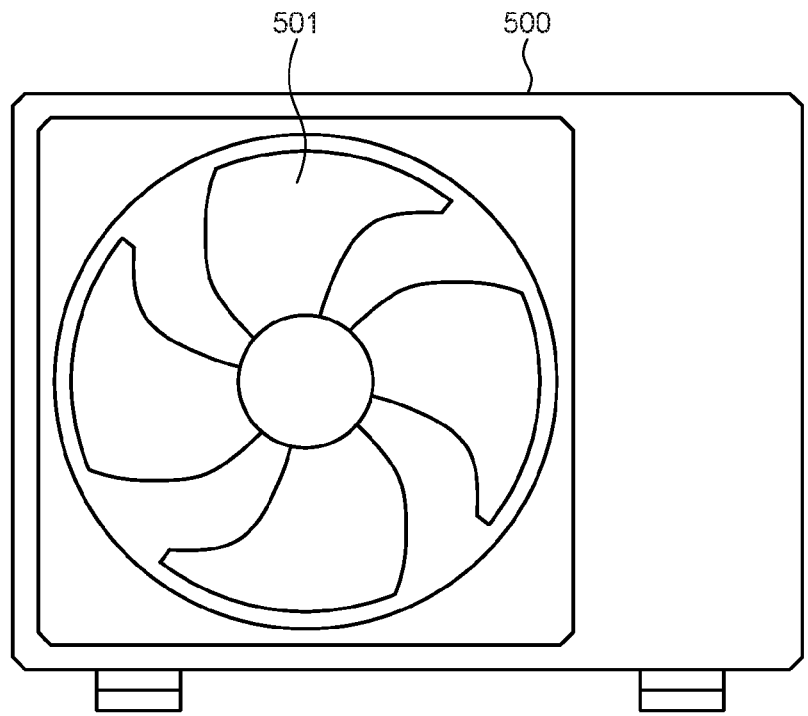
(a)
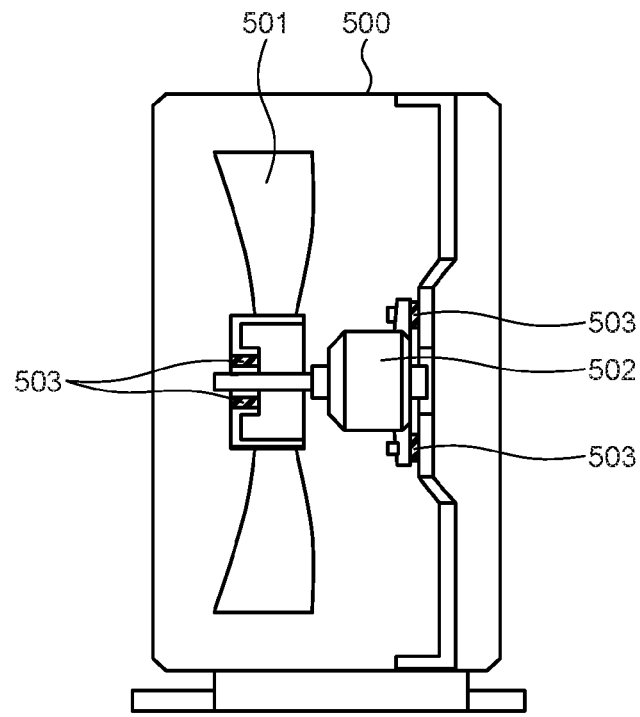
(b)

DRIVE CIRCUIT FOR SYNCHRONOUS MOTOR, SYNCHRONOUS MOTOR DRIVEN BY DRIVE CIRCUIT, AIR BLOWER INCLUDING SYNCHRONOUS MOTOR, AIR CONDITIONER INCLUDING AIR BLOWER, AND METHOD OF DRIVING SYNCHRONOUS MOTOR

CROSS REFERENCE TO RELATED APPLICATION

This application is a U.S. national stage application of International Patent Application No. PCT/JP2014/050253 filed on Jan. 9, 2014, the disclosure of which is incorporated herein by reference.

TECHNICAL FIELD

The present invention relates to a drive circuit of a synchronous motor, a synchronous motor driven by the drive circuit, an air blower including the synchronous motor, an air conditioner including the air blower, and a method of driving the synchronous motor.

BACKGROUND

As an electric motor to drive a fan of an air blower, an air conditioner, or the like, a synchronous motor in which permanent magnets are used in a rotor is often used to reduce a power consumption during an operation. Such a synchronous motor using the permanent magnets is typically driven by a square-wave or sine-wave drive system that detects the magnetic pole position of the rotor and causes a drive current synchronized with the magnetic pole position of the rotor to flow through the stator winding by using an inverter including semiconductor elements or electronic parts. For example, with the 120°-square-wave drive system that is used for driving a three-phase synchronous motor, the cycle of 120° forward energization, 60° non-energization, 120° reverse energization, and 60° non-energization is repeated for respective phases at the timings shifted by 60° from each other, so that a current flows through the stator windings of any two of the three phases to drive the motor. Such a square-wave drive system can be achieved with a simple control mechanism compared to that for a sine-wave drive system, which contributes to the cost reduction.

Also, in a three-phase synchronous motor in which stator winding wound around teeth in a concentrated manner, the ratio of the number of magnetic poles of the permanent magnet used in a rotor and the number of slots (=number of teeth) in a stator is often 2:3. Also, one known synchronous motor uses a combination of the number of magnetic poles and the number of slots that enables a magnetic flux generated by permanent magnets to be effectively interlinked with a winding of a stator (see, for example, Patent Literature 1 and 2). A synchronous motor using such a combination of the number of magnetic poles and the number of slots is a highly efficient synchronous motor having a small loss therein.

PATENT LITERATURE

Patent Literature 1: Japanese Patent Application Laid-Open No. 62-110468
Patent Literature 2: Japanese Patent Application Laid-Open No. 9-172762

When a pulsating component is included in output torque in a synchronous motor, a fan vibrates due to a variation in electromagnetic excitation force in a circumferential direction and a noise is generated. Also, an abrupt change in current flowing to a stator winding causes an abrupt change in electromagnetic force, thereby changing magnetic attractive force between a rotor and a stator. The change in magnetic attractive force generates electromagnetic excitation force in a radial direction. As a result, a body of a synchronous motor may vibrate and generate a noise.

A noise generated by a vibration of a fan can be suppressed by attenuating transmission of output torque ripple of the synchronous motor by providing a member including an elastic material such as an elastomer between the fan and an output shaft of a synchronous motor. However, in order to suppress a vibration/noise of the body of the synchronous motor, it is necessary to control the electromagnetic excitation force in the radial direction.

There is disclosure in Patent Literature above of a combination of the number of magnetic poles and the number of slots that achieves both the improvement in the winding utilization rate (winding factor) and the suppression of cogging torque. However, when the motor is driven by using a square-wave drive system, depending on the combination, the rotating magnetic field, which is generated with respect to a rotary shaft of a rotor by a current flowing to a stator winding, is generated unevenly due to an abrupt change in the flowing current. In such a case, there is a problem in that the attractive/repulsion force between the permanent magnets of the rotor and the stator is exerted in an imbalanced manner on the rotary shaft, and thus a strong electromagnetic excitation force is generated in the radial direction, which may become a factor in generating a vibration/noise of the body of a synchronous motor.

SUMMARY

The present invention is achieved in view of the forgoing and an object of the present invention is to provide: a drive circuit for a synchronous motor, which can suppress a vibration/noise due to electromagnetic excitation force in a radial direction for efficiently driving the motor by using a square-wave drive system; a synchronous motor driven by the drive circuit; an air blower including the synchronous motor; an air conditioner including the air blower; and a method of driving the synchronous motor.

To solve the above problem and achieve the object, there is provided a drive circuit for a synchronous motor including a rotor having ten magnetic poles formed by a permanent magnet, and a stator in which a winding is wound in a concentrated manner around nine teeth facing the rotor, the drive circuit including: an inverter including a plurality of switching elements in bridge connection; and a control unit that controls the inverter in such a manner that a square-wave-shaped current flows to the winding, wherein the control unit operates such that an energization phase at which to pass the current falls within a range of electric angles of −10° to +5° from an energization phase at which the current is minimum when a target torque of the synchronous motor is generated.

According to the present invention, an effect is obtained where it is possible to suppress a vibration/noise due to electromagnetic excitation force in a radial direction in a case of efficiently driving a motor by using a square-wave drive system.

BRIEF DESCRIPTION OF DRAWINGS

FIG. 19 is a diagram illustrating an example of an air blower according to a second embodiment.

DETAILED DESCRIPTION

In the following, a drive circuit for a synchronous motor, a synchronous motor driven by the drive circuit, an air blower including the synchronous motor, an air conditioner including the air blower, and a method of driving the synchronous motor according to embodiments of the present invention will be described with reference to the accompanying drawings. Note that the present invention is not limited to the embodiments described in the following.

First Embodiment

Figure 1:
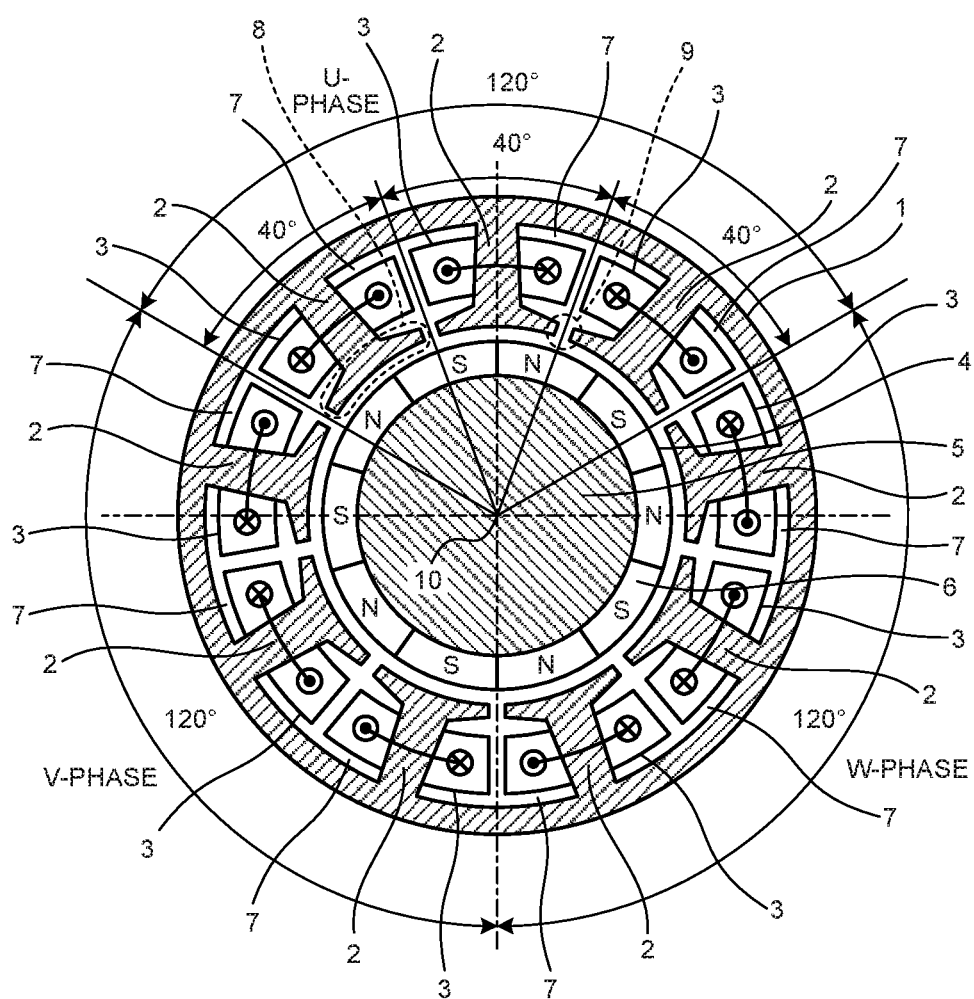
FIG. 1 is a transverse cross-sectional view of a synchronous motor according to a first embodiment.

FIG. 1 is a transverse cross-sectional view of a synchronous motor according to the first embodiment. In the present embodiment, as illustrated in FIG. 1, an example of a synchronous motor including a rotor 4, in which permanent magnets are arranged in such a manner as to face an inner peripheral surface of a stator 1, will be described.

The stator 1 includes nine protruded iron cores (hereinafter, each referred to as "tooth") 2 formed on the annular iron core centered on a center axis 10. The teeth 2 are formed at equal angular intervals (mechanical angle 40°) in the circumferential direction and face toward the center axis 10. The stator 1 also includes nine slots 7, which are formed between the teeth 2 and hold stator windings 3 wound around the teeth 2. The teeth 2 are divided into three groups for three phases (U-phase, V-phase, and W-phase; 120° each), which are adjacent to each other and each include three teeth 2, and the stator winding 3 for each phase is wound in a concentrated manner in a direction of an arrow in each slot 7. The stator windings 3 are wound around the teeth 2 in such manner that they are wound in opposite directions around the teeth 2 that are adjacent to each other and of the same phase and are wound in the same direction around the teeth 2 that are adjacent to each other and of different phases.

Note that as described above, in the present embodiment, the teeth 2 provided in the stator 1 in such a manner as to face the rotor 4 are formed at the equal angular intervals (a mechanical angle of 40°) in the circumferential direction and face toward the shaft center 10. Thus, the leading end parts of the teeth 2, which face the rotor 4, have uniform widths in the circumferential direction thereof while the opening parts of the respective slots 7 between the teeth 2 have uniform widths in the circumference direction thereof. The leading end part of the tooth 8 and the opening part of the slot 9 are hereinafter referred to as "tooth leading end part 8" and "slot opening part 9", respectively.

In the rotor 4, a 10-pole permanent magnet 6 is disposed on the outer peripheral surface of a columnar back yoke 5 centered on the center axis 10 in such a manner that magnetic poles with different polarities are alternatively arranged at equal angular intervals (a mechanical angle of 36°) in the circumferential direction. The rotor 4 is disposed rotatably inside the teeth 2 in such a manner as to face the stator 1. Note that FIG. 1 illustrates an example of a synchronous motor having a relatively low output for use in an air blower or the like. For permanent magnets 6, for example, a relatively low-cost material having low magnetic force, such as a ferrite magnet is used. Also, FIG. 1 illustrates an example in which imbricate sintered magnets as the permanent magnets 6 are disposed on the surface of the back yoke 5 of a magnetic material. However, for the permanent magnet 6, a ring-shaped bonded magnet made from a mixture of resin and a magnetic particle may be used.

Figure 2:
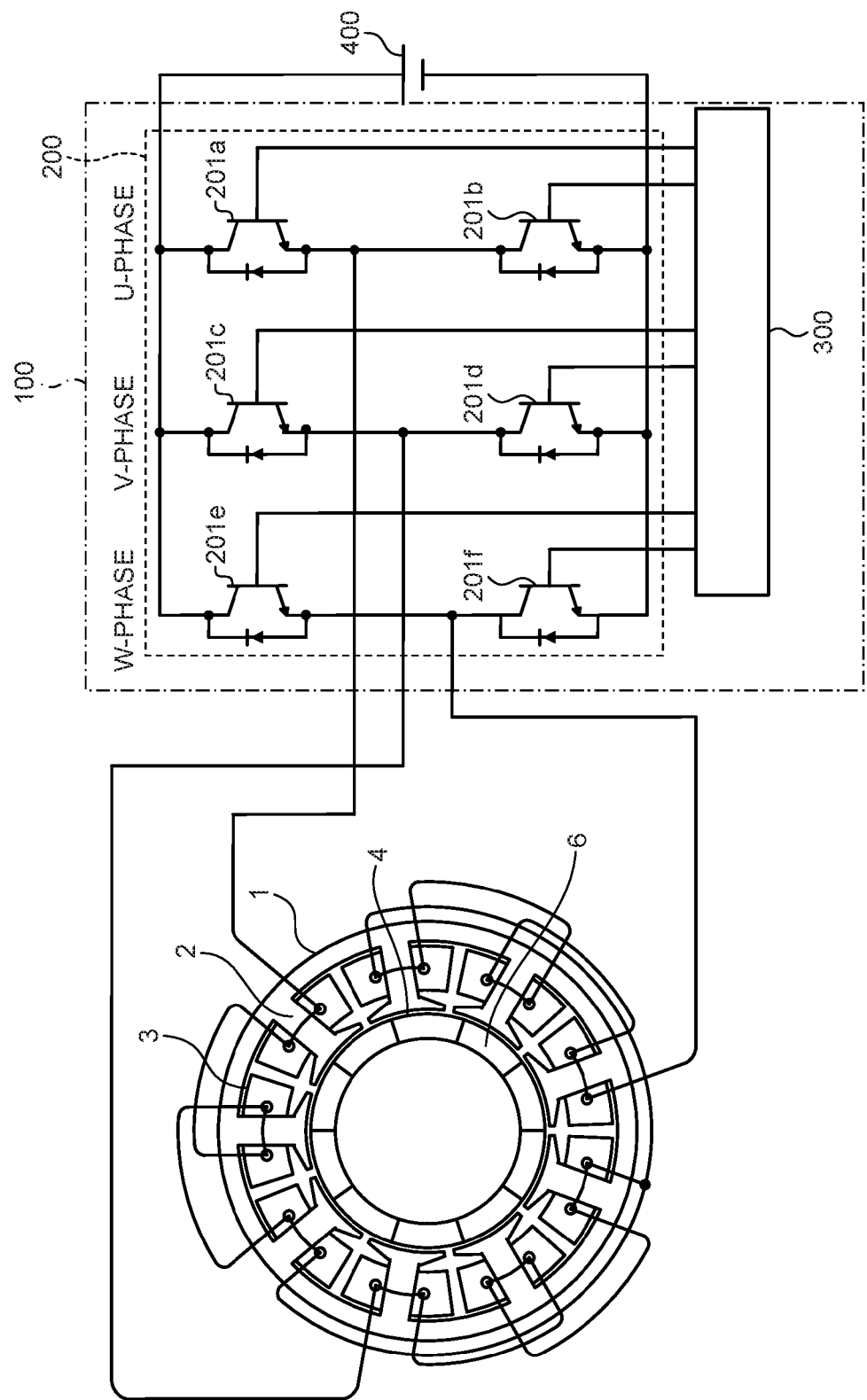
FIG. 2 is a diagram illustrating an example of connection between the synchronous motor according to the first embodiment and a drive circuit therefor.

FIG. 2 is a diagram illustrating an example of connection between the synchronous motor according to the first embodiment and a drive circuit therefor. As illustrated in FIG. 2, a drive circuit 100 that drives the synchronous motor according to the present embodiment includes: an inverter 200 that is supplied with a DC power from a DC power source 400 and includes a plurality of switching elements 201a, 201b, 201c, 201d, 201e, and 201f in full-bridge connection; and a control unit 300 to control the switching elements 201a, 201b, 201c, 201d, 201e, and 201f included in the inverter 200.

The control unit 300 drives the synchronous motor by using a 120° square-wave drive system that causes a square-wave-shaped current to flow by controlling the inverter 200 in such a manner that constant voltage is serially applied to the stator windings 3 in each phase in accordance with the magnetic pole position of the rotor 4, that is, in synchronization with the induced voltage generated in the stator windings 3 in each phase. It is to be understood that the present invention is not limited by a method of adjusting a voltage applied to the stator windings 3 in each phase of the synchronous motor. For example, the present invention may use a system called pulse width modulation (PWM) that performs high-frequency switching control on each of the switching elements 201a, 201b, 201c, 201d, 201e, and 201f so as to adjust duration of energization/non-energization of current, or a system that adjusts a DC busbar voltage output from the DC power source 400.

Next, a description is made as to a function and effect of the synchronous motor according to the first embodiment described above with reference to FIG. 1 and FIG. 2.

In a permanent magnet synchronous motor of a concentrated winding structure, a "winding factor" calculated from an angle of one magnetic pole and an angle of one tooth in the circumferential direction is often used as an index of performance.

The higher winding factor enables more efficient interlinkage between a magnetic flux of the permanent magnet and a stator winding, so that a large torque is obtained without changing the current. This achieves a higher output or efficiency of the synchronous motor.

Figures 3, 4:
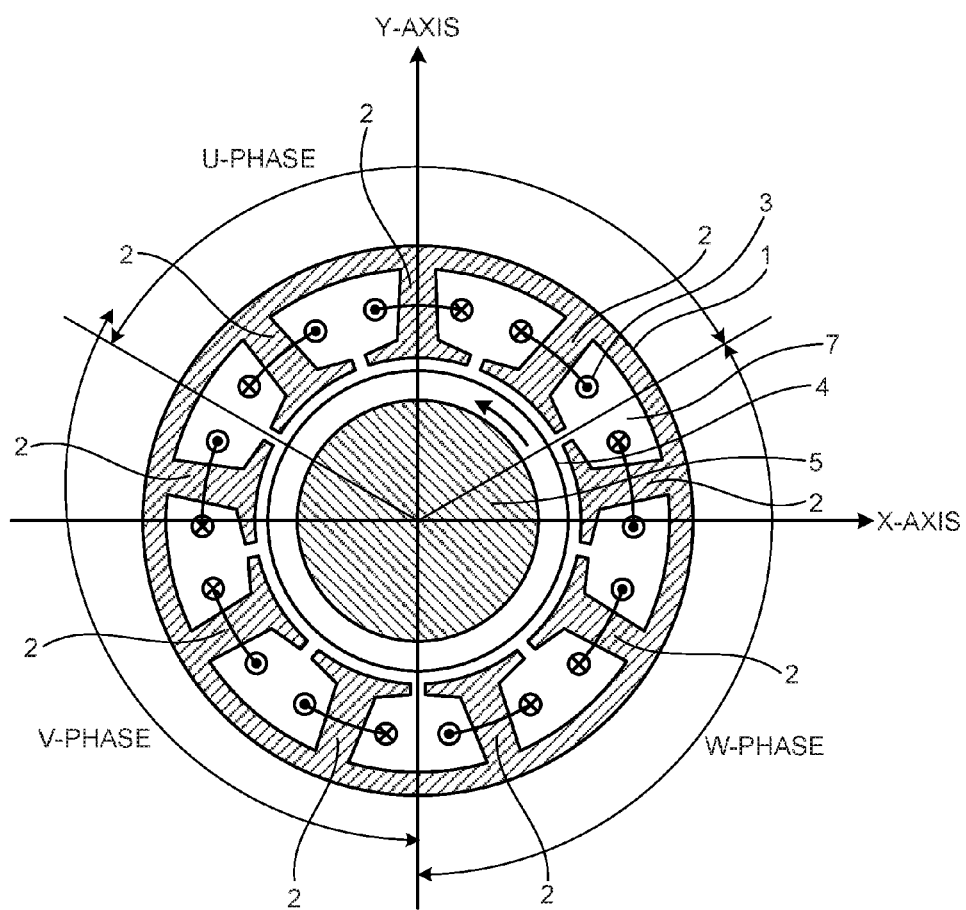
FIG. 3 is a chart illustrating an example of a winding factor determined by a combination of the number of poles in a rotor and the number of slots (number of winding) in a stator.
FIG. 4 is a diagram defining two orthogonal axes (X-axis and Y-axis) on a transverse cross-sectional view of a 9-slot synchronous motor of concentrated winding structure.

FIG. 3 is a chart illustrating an example of a winding factor determined by a combination of the number of poles in a rotor and the number of slots (number of winding) in a stator. In a combination example illustrated in FIG. 3, a combination of an 8-pole or 10-pole rotor and a 9-slot stator has the highest winding factor. That is, a synchronous motor having a combination of 8 poles with 9 slots or a combination of 10 poles with 9 slots has higher efficiency than a synchronous motor of any other combination example illustrated in FIG. 3.

Meantime, a 10-pole 9-slot or 8-pole 9-slot synchronous motor of a concentrated winding structure is known to have large magnetic attractive force in the radial direction as attractive/repulsion force between a permanent magnet of a rotor and a stator is exerted in an imbalance manner on the rotary shaft of the rotor.

Figure 5:
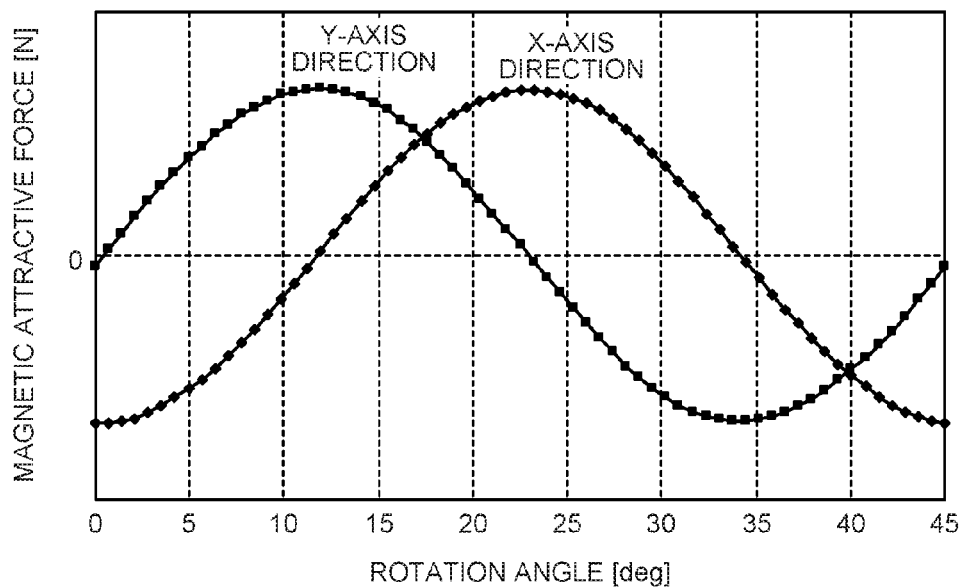
FIG. 5 is a graph illustrating change in magnetic attractive force in directions of the X-axis and the Y-axis illustrated in FIG. 4 in accordance with a rotation angle when an 8-pole 9-slot synchronous motor is driven by using a sine-wave drive system.

Next, a description is given of an example where a synchronous motor is driven by using a sine-wave drive system with reference to FIG. 4 to FIG. 7. FIG. 4 is a view defining two orthogonal axes (X-axis and Y-axis) on a transverse cross-section of a 9-slot synchronous motor of a concentrated winding structure. FIG. 5 is a graph illustrating changes in magnetic attractive force in directions of the X-axis and the Y-axis illustrated in FIG. 4 in accordance with the rotation angle when an 8-pole 9-slot synchronous motor is driven by using a sine-wave drive system. In the example illustrated in FIG. 5, the magnetic attractive force generated between the stator 1 and the rotor 4, in the directions of the X-axis and the Y-axis illustrated in FIG. 4 when the rotor 4 is rotated is calculated by a magnetic field analysis. In this example of FIG. 5, the rotor is rotated in the counterclockwise direction indicated by a solid arrow of FIG. 4 upon passage of a sine-wave current to the stator windings 3 in the 8-pole 9-slot synchronous motor, torque is generated by passage of a sine-wave current to the stator windings 3 in each phase in accordance with a magnetic pole position, and the rotor is rotated in the counterclockwise direction indicated by the solid arrow in the figure.

As illustrated in FIG. 5, when the 8-pole 9-slot synchronous motor is driven by using the sine-wave drive system, the magnetic attractive force having one cycle of 45°, that is, the sine-wave-shaped magnetic attractive force having eight cycles per rotation of the rotor 4 is generated between the rotor 4 and the stator 1 along with the rotation of the rotor 4. Note that when the 10-pole 9-slot synchronous motor illustrated in FIG. 1 is driven by using the sine-wave drive system, the sine wave-shaped magnetic attractive force having ten cycles per rotation of the rotor 4 is generated although not illustrated.

Figure 6:
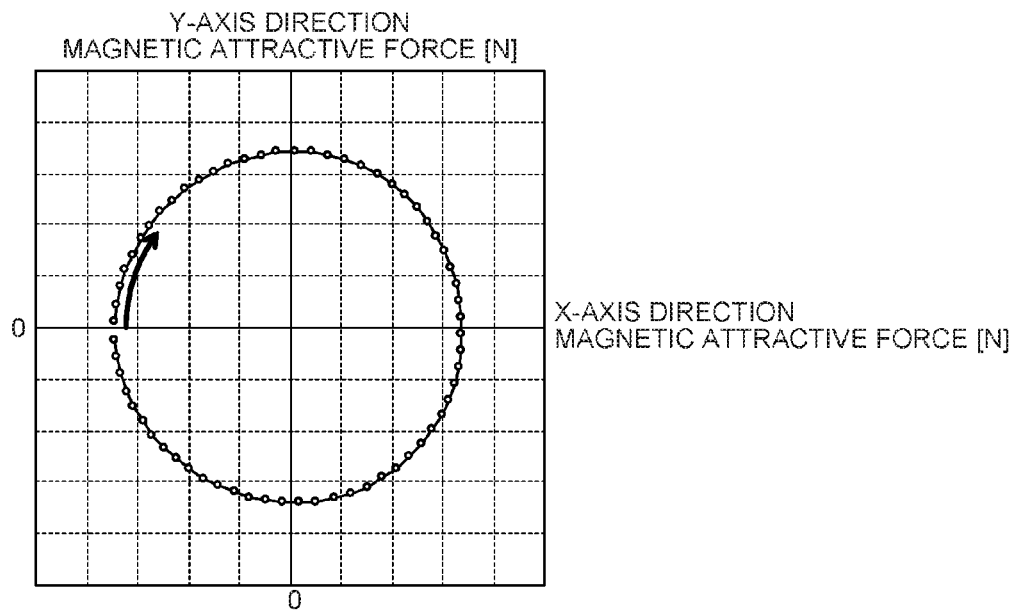
FIG. 6 is a diagram illustrating a Lissajous curve indicating a trajectory of magnetic attractive force in a radial direction in one cycle of the sine wave-shaped magnetic attractive force illustrated in FIG. 5.

FIG. 6 is a diagram illustrating a Lissajous curve indicating a trajectory of magnetic attractive force in a radial direction in one cycle of the sine-wave-shaped magnetic attractive force illustrated in FIG. 5. As illustrated in FIG. 6, when the synchronous motor is driven by the sine-wave drive system, substantially constant magnetic attractive force in the radial direction, which forms a circular trajectory along with the rotation of the rotor 4, is generated changing its direction. That is, when the synchronous motor is driven by the sine-wave drive system, a change of the magnetic attractive force in the radial direction is extremely small.

Figure 7:
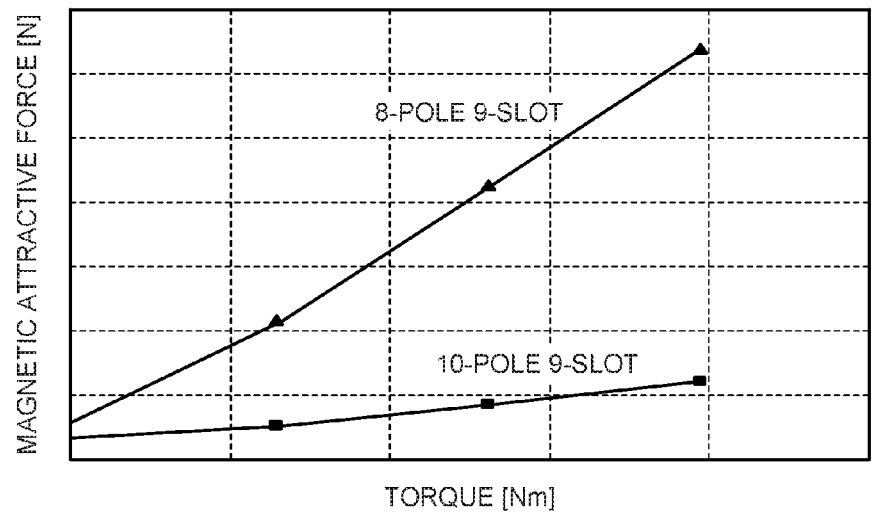
FIG. 7 is a graph illustrating a relationship between generated torque and magnetic attractive force in each of 10-pole 9-slot and 8-pole 9-slot synchronous motors having a concentrated winding structure.

FIG. 7 is a graph illustrating a relationship between a generated torque and magnetic attractive force in each of 10-pole 9-slot and 8-pole 9-slot synchronous motors of concentrated winding structures. FIG. 7 illustrates an example in which the magnetic attractive force of the 10-pole 9-slot and 8-pole 9-slot synchronous motors that include the stators 1 having the same shape and permanent magnets 6 having equivalent magnetic force are shown for the purpose of comparison.

As illustrated in FIG. 7, the magnetic attractive force is increased as the generated torque becomes larger. The comparison between the 10-pole 9-slot synchronous motor and the 8-pole 9-slot synchronous motor reveals that the magnetic attractive force of the 10-pole 9-slot synchronous motor is weaker than the magnetic attractive force of the 8-pole 9-slot synchronous motor. More specifically, the magnetic attractive force of the 10-pole 9-slot synchronous motor is equal to or weaker than ¼ of that of the 8-pole 9-slot synchronous motor.

Next, an example in which a synchronous motor is driven by using a 120° square-wave drive system will be described with reference to FIG. 8 to FIG. 12.

A synchronous motor having a relatively low output includes a position detecting sensor, which can detect a position of a stator, such as a magnetic pole sensor. In most cases, such a synchronous motor uses what is called a square-wave drive system that drives the motor by switching energization of a stator winding of each phase in synchronization with a signal output from the position detecting sensor. Unlike the above-described sine-wave drive system, current flowing to the synchronous motor has a square wave shape. Such a square-wave drive system can be achieved with a simple control mechanism compared to the case of the sine-wave drive system, contributes to the cost reduction.

As described above, in the present embodiment, the 10-pole 9-slot three-phase synchronous motor of the structure illustrated in FIG. 1 is driven by using the 120° square-wave drive system that serially applies constant voltage to the stator windings 3 in each phase in synchronization with the induced voltage generated in the stator windings 3 of each phase so as to cause a square-wave-shaped current to flow.

Figure 8:
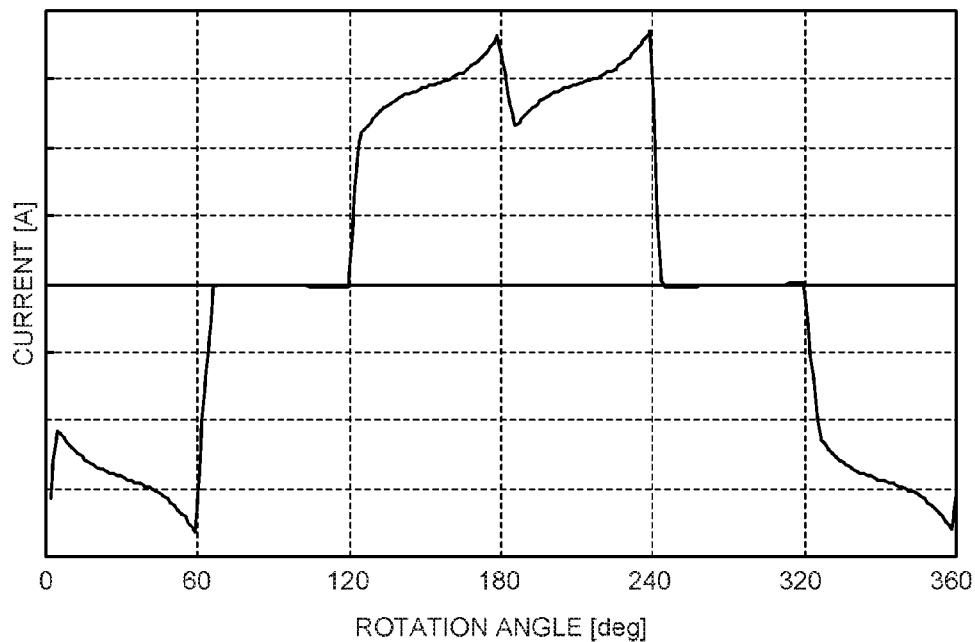
FIG. 8 is a graph illustrating one cycle of a waveform of current flowing through a stator winding in each phase in a 120° square-wave drive system.

FIG. 8 is a graph illustrating one cycle of a waveform of current that flows through a stator winding of each phase in the 120° square-wave drive system. As illustrated in FIG. 8, in the 120° square-wave drive system, a square-wave-shaped current is caused to flow to the stator windings of the respective phases at the timings shifted by 60° from each other with a cycle of 120° forward energization (from 120° to 240°), 60° non-energization (from 240° to 320°), 120° reverse energization (from 320° to 60°), and 60° non-energization (from 60° to 120°). By using the 120° square-wave drive system, the current flows the stator windings 3 of any two of the three phases to thereby rotate the rotor 4 in a synchronized manner. As illustrated in FIG. 8, with such a square-wave drive system, the flowing current changes abruptly at the time of switching between the energization and non-energization.

Figure 9:
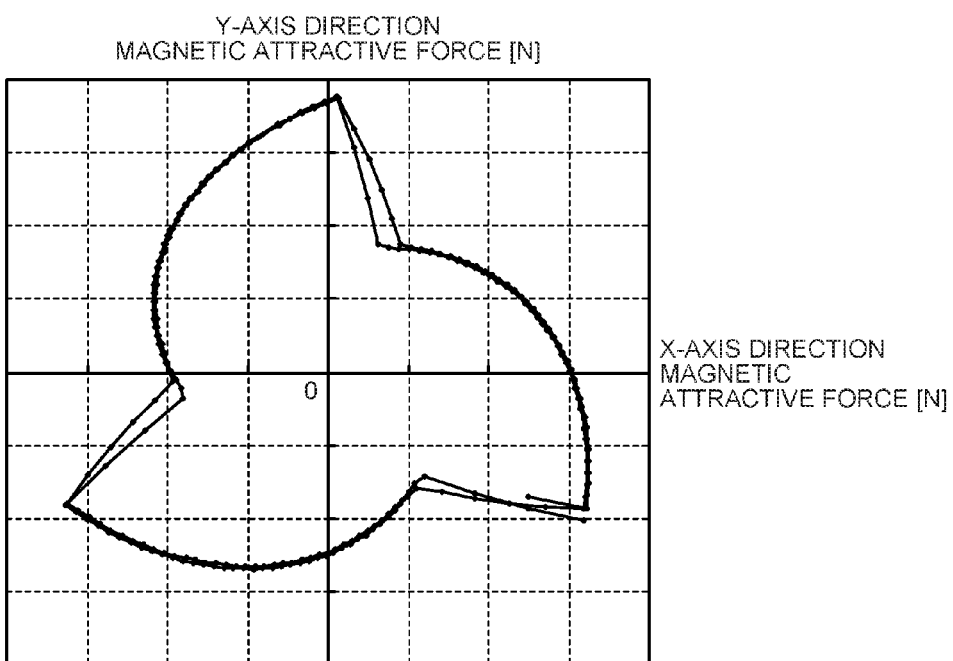
FIG. 9 is a diagram illustrating a Lissajous curve indicating a trajectory of magnetic attractive force in a radial direction in one cycle of a waveform of flowing current in a case where the 8-pole 9-slot synchronous motor is driven by using the 120° square-wave drive system.
Figure 10:
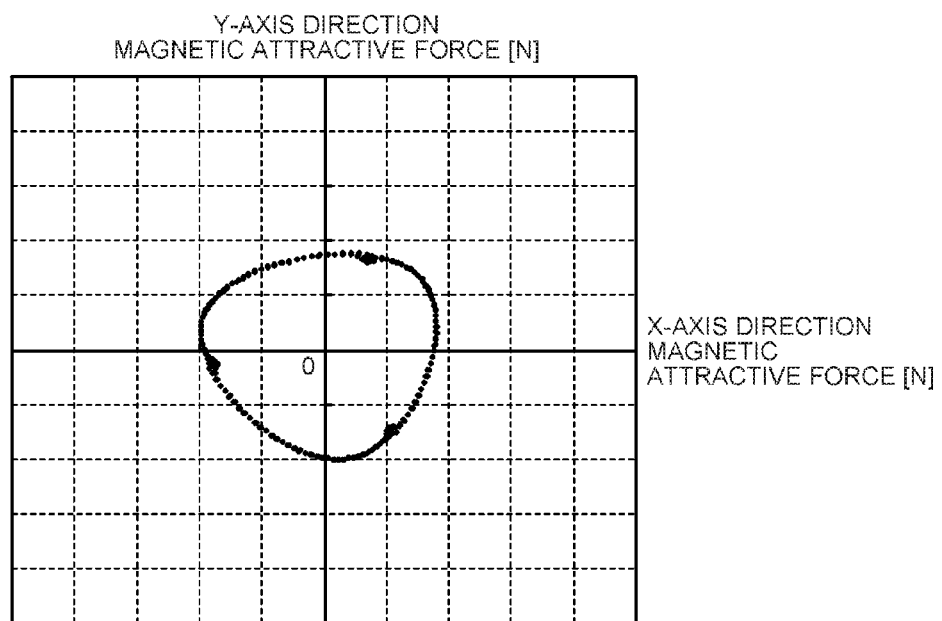
FIG. 10 is a diagram illustrating a Lissajous curve indicating a trajectory of magnetic attractive force in a radial direction in one cycle of a waveform of flowing current in a case where the 10-pole 9-slot synchronous motor is driven by using the 120° square-wave drive system.

FIG. 9 is a diagram illustrating a Lissajous curve indicating a trajectory of magnetic attractive force in a radial direction in one cycle of a waveform of flowing current in a case where the 8-pole 9-slot synchronous motor is driven by using the 120° square-wave drive system. Also, FIG. 10 is a diagram illustrating a Lissajous curve indicating a trajectory of magnetic attractive force in a radial direction in one cycle of a waveform of flowing current in a case where the 10-pole 9-slot synchronous motor is driven by using the 120° square-wave drive system. In an example illustrated in each of FIG. 9 and FIG. 10, the trajectory of magnetic attractive force in the radial direction in the one cycle of the waveform of the flowing current in the case of the 120° square-wave drive system is calculated by a magnetic field analysis.

As illustrated in FIG. 9, in a case where the 8-pole 9-slot synchronous motor is driven by the 120° square-wave drive system, the magnetic attractive force in the radial direction changes abruptly at the time of switching between energization and non-energization. The abrupt change in the magnetic attractive force in the radial direction is equivalent to application of impulse excitation force to a synchronous motor. That is, a natural vibration is generated at the time of switching between energization and non-energization the current passage and no current passage and a noise in a frequency of the natural vibration is generated. The excitation force generated by the change in the magnetic attractive force in the radial direction will be hereinafter referred to as "radially-directed electromagnetic excitation force."

On the other hand, as illustrated in FIG. 10, when the 10-pole 9-slot synchronous motor is driven by using the 120° square-wave drive system, the magnetic attractive force in the radial direction does not change abruptly at the time of switching between energization and non-energization and hence the radially-directed electromagnetic excitation force is hardly generated unlike the case where the 8-pole 9-slot synchronous motor is driven by using the 120° square-wave drive system. That is, even when the 10-pole 9-slot synchronous motor is driven by using the 120° square-wave drive system, the radially-directed electromagnetic excitation force at time of switching between energization and non-energization the passage of the current and no passage of the current can be suppressed and hence a vibration/noise due to the radially-directed electromagnetic excitation force can be suppressed.

Figure 11:
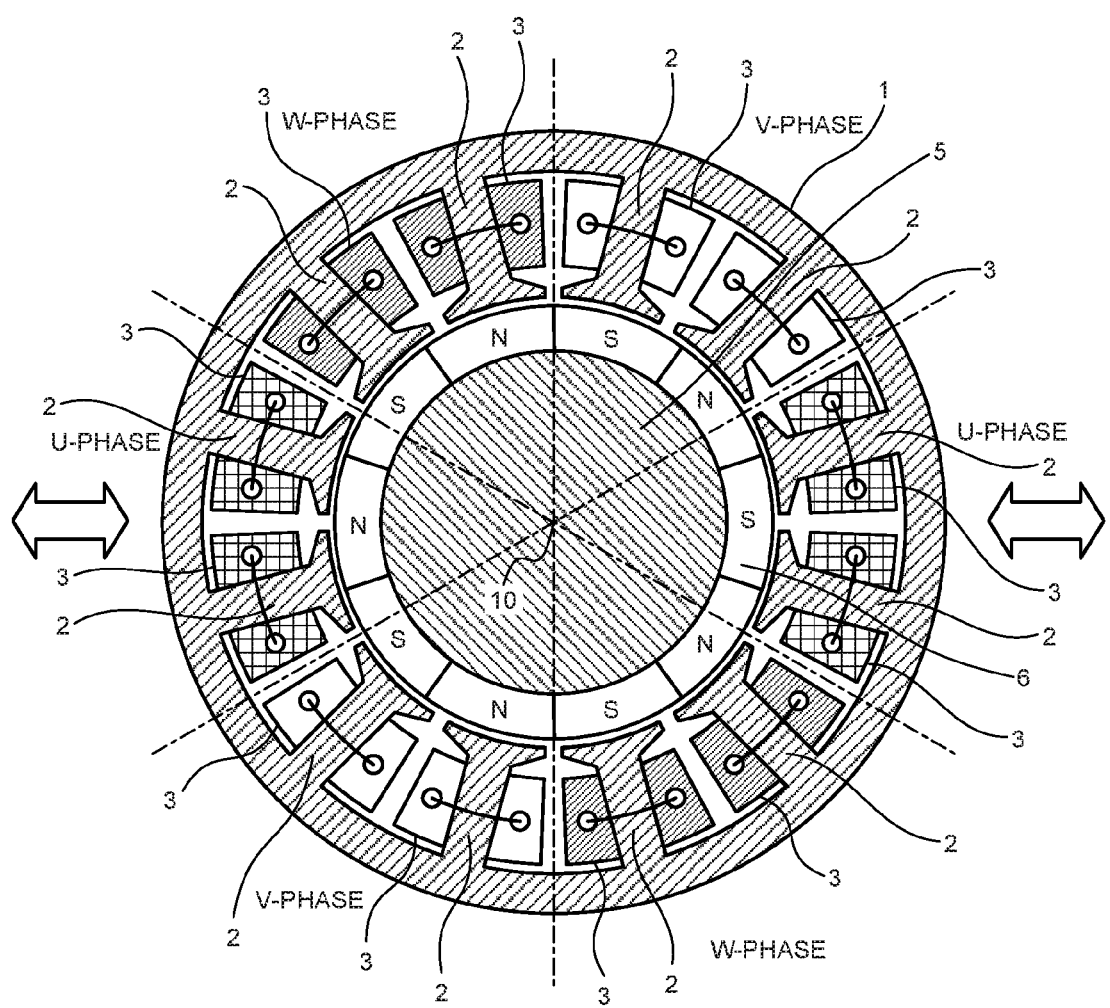
FIG. 11 is a transverse cross-sectional view of a 10-pole 12-slot synchronous motor.

FIG. 11 is a transverse cross-sectional view of a 10-pole 12-slot synchronous motor. As illustrated in FIG. 3, the 10-pole 12-slot synchronous motor illustrated in FIG. 11 has the highest winding factor other than the 10-pole 9-slot and 8-pole 9-slot synchronous motors. Also, since the number of slots is large and windings are distributed, a coil end is small. Thus, a flat electric motor is suitable for improving efficiency.

However, as illustrated in FIG. 11, in the 10-pole 12-slot synchronous motor, the stator windings 3 in each phase are typically arranged in a manner concentrated in two parts that face each other with respect to the center axis 10 of the rotor 4. Thus, as indicated by an arrow in the figure, attractive/repulsion force (hereinafter, referred to as "magnetic attraction/repulsion force") between the permanent magnet 6 of the rotor 4 and the teeth 2 around which the stator windings 3 in each phase are wound is applied in each phase from two opposite directions with respect to the center axis 10. As a result, the stator is easily vibrated or deformed into an elliptical shape under the attraction/repulsion force. Note that in the example illustrated in FIG. 11, the magnetic attraction/repulsion force generated between the permanent magnet 6 of the rotor 4 and the teeth 2 around which the stator windings 3 in the U-phase are wound is illustrated.

In a case where such a 10-pole 12-slot synchronous motor is driven by using the square-wave drive system, the magnetic attraction/repulsion force that is exerted on the stator 1 in such a direction as to bring the stator into the elliptical shape abruptly changes at the time of switching between energization and non-energization. Thus, the radially-directed electromagnetic excitation force is increased and hence a noise in a natural vibration frequency due to the radially-directed electromagnetic excitation force is increased.

Thus, it is preferable that the 10-pole 12-slot synchronous motor illustrated in FIG. 11 is driven by using the sine-wave drive system that makes a gentle change in the current flowing to the stator windings 3 in each phase. However, the sine-wave drive system requires a highly advanced control technology such as vector control in order to change the voltage applied to the stator windings 3 in each phase into a sine wave shape. Thus, the control mechanism is more complicated than that of the square-wave drive system and it is necessary to configure the control unit using a microcomputer and the like that can perform advanced waveform generation processing. In addition, since a circuit configuration of the control unit is more complicated, a cost or size of the control unit is increased.

Figure 12:
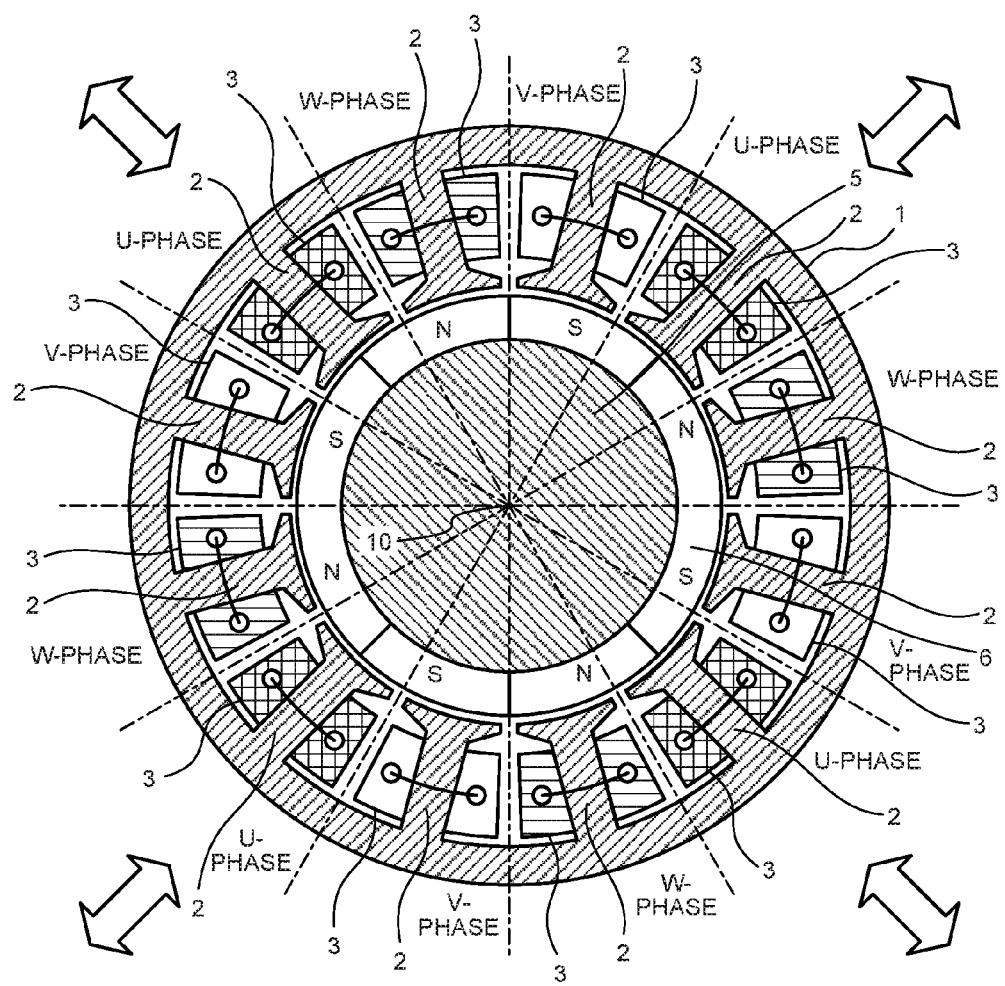
FIG. 12 is a transverse cross-sectional view of an 8-pole 12-slot synchronous motor.

FIG. 12 is a transverse cross-sectional view of an 8-pole 12-slot synchronous motor. In an example illustrated in FIG. 12, the magnetic attraction/repulsion force generated between the permanent magnets 6 of the rotor 4 and the teeth 2 around which the stator windings 3 in the U-phase are wound is also illustrated. In the 8-pole 12-slot synchronous motor illustrated in FIG. 12, the stator windings 3 in each phase are arranged in separate four parts at intervals of 90° in each phase. Since the magnetic attraction/repulsion force that is exerted on the stator 1 is generated in directions orthogonal to each other (directions of arrow in the figure), the radially-directed electromagnetic excitation force at the time of the switching between energization and non-energization is equal and a noise of a natural vibration frequency due to the radially-directed electromagnetic excitation force is reduced even in a case where the motor is driven by using the square-wave drive system. However, as illustrated in FIG. 3, the 8-pole 12-slot synchronous motor has a lower winding factor than a synchronous motor with any other combination of the number of poles/the number of slots and hence has disadvantage in efficiency.

Figure 13:
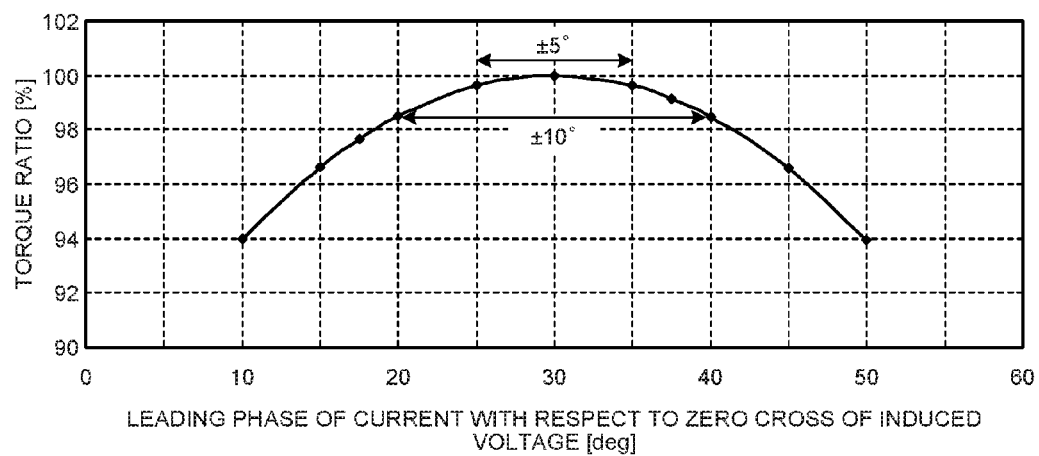
FIG. 13 is a graph illustrating a relationship between the timing of starting energization and generated torque in the case of the 120° square-wave drive system.

Next, the square-wave drive system in the synchronous motor according to the first embodiment will be described with reference to FIG. 13 to FIG. 16. FIG. 13 is a graph illustrating a relationship between the timing of starting energization and the generated torque in the case of 120° square-wave drive system.

As described above, in the square-wave drive system, constant voltage is serially applied to the stator windings 3 in synchronization with the induced voltage generated in the stator windings 3 in each phase and a square-wave-shaped current is caused to flow so that a synchronous motor is driven. In this square-wave drive system, the magnitude of generated torque changes depending upon the timing (phase) at which to pass the current with respect to the induced voltage. Typically, as illustrated in FIG. 13, in order to generate the largest torque with the same current value, it is preferable that energization is started at the timing advanced by 30° from a zero-crossing of the induced voltage in the above-described 120° square-wave drive system. For example, even when the timing of starting energization is shifted by ±10° from the maximum-torque generation phase, 98% or more of the generated torque resulting from the energization at the maximum-torque generation phase is achieved. When the timing of starting energization is in a range of ±5° from the maximum-torque generation phase, 99.5% of the generated torque resulting from the energization at the maximum-torque generation phase is achieved. Thus, the use of such ranges of the timing of starting the energization does not have much influence on the characteristics of the synchronous motor.

Figure 14:
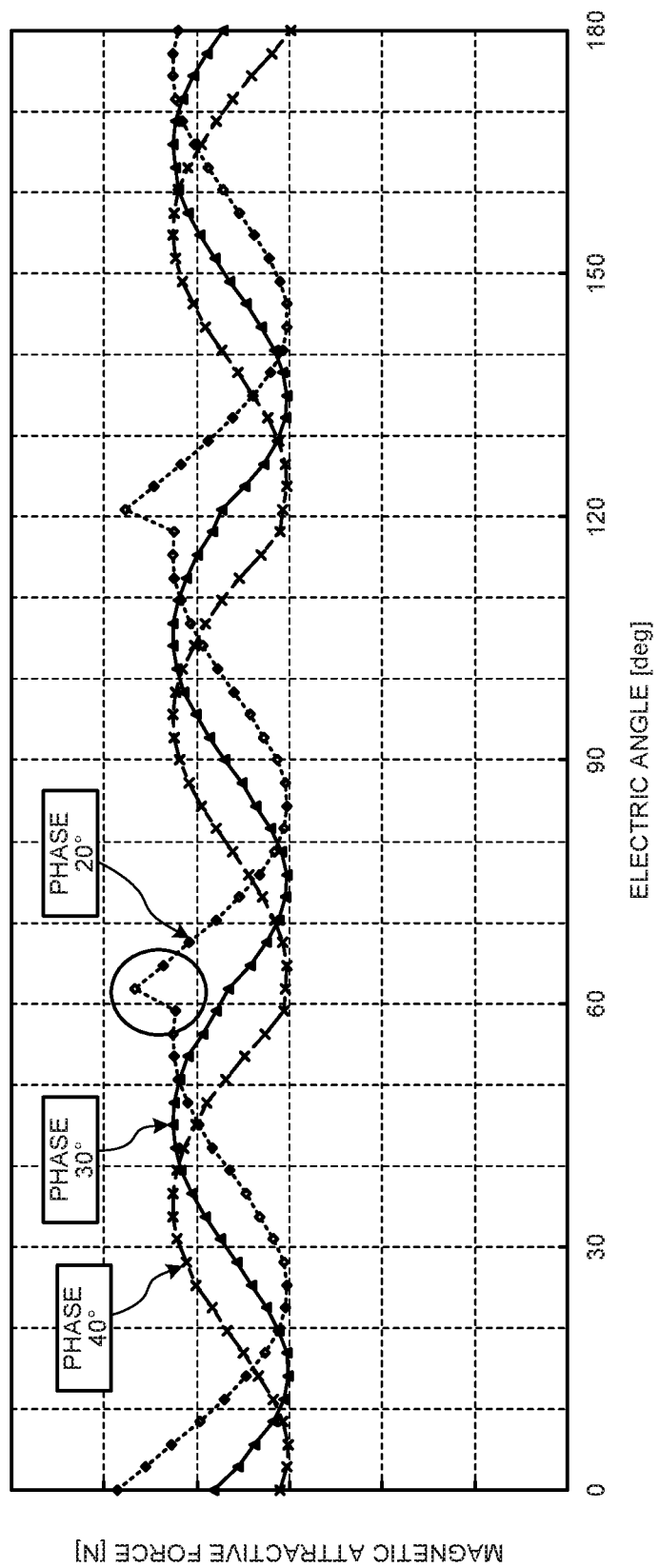
FIG. 14 is a graph illustrating a relationship between the timing of starting the energization and the magnetic attractive force in a case where the 10-pole 9-slot synchronous motor is driven by using the 120° square-wave drive system.

FIG. 14 is a graph illustrating a relationship between the timing of starting the energization and the magnetic attractive force in a case where the 10-pole 9-slot synchronous motor is driven by using the 120° square-wave drive system. In FIG. 14, the vertical axis indicates magnetic attractive force and the horizontal axis indicates an electric angle.

As illustrated in FIG. 14, when the energization is started at a maximum-torque generation phase, that is, at the timing advanced by 30° from the zero-crossing of the induced voltage (solid line in FIG. 14) and when the energization is started at a phase advanced by an angle of 10° from the maximum-torque generation phase, that is, at the timing advanced by 40° from the zero-crossing of the induced voltage (dashed-dotted line in FIG. 14), the magnetic attractive force is changed in a sine wave shape with respect to the electric angle. However, when the energization is started at a phase delayed by 10° from the maximum-torque generation phase, that is, at the timing advanced by 20° from the zero-crossing of the induced voltage (dashed line in FIG. 14), the magnetic attractive force changes greatly near the electric angle of 60° and the electric angle of 120°. When the magnetic attractive force abruptly changes, the radially-directed electromagnetic excitation force is generated accordingly, which is a factor in generating a vibration/noise of the synchronous motor.

Figure 15:
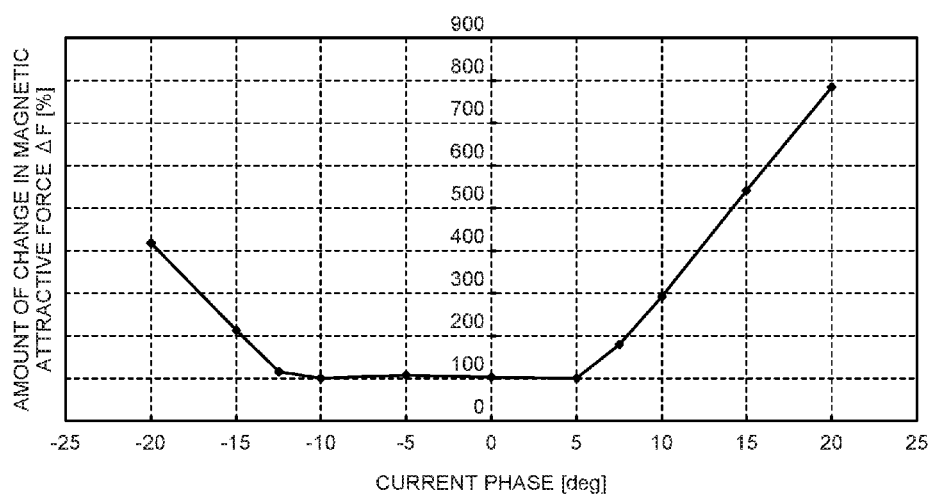
FIG. 15 is a graph illustrating an amount of change in magnetic attractive force in a short period of time in a case where the timing of starting the energization is changed from a maximum-torque generation phase as a reference.

FIG. 15 is a graph illustrating an amount of change in magnetic attractive force in a short period of time in a case where the timing of starting the energization is changed from the maximum-torque generation phase, that is, as a reference. As illustrated in FIG. 15, when the timing of starting the energization is in the range from −10° to +5° from the maximum-torque generation phase, as a reference, variation from the amount of change in the magnetic attractive force at the maximum-torque-generation phase is extremely small. That is, when an acceptable range of timing of starting the energization is the range from −10° to +5° from the maximum-torque-generating phase, that is, a reference, it is possible to suppress the variation of the magnetic attractive force, and thus suppress a vibration or a noise generated from the body of the synchronous motor. In other words, it is possible to construct a synchronous motor with a low vibration and low noise by performing an operation such that the energization phase at which to pass the current falls within the range from −10° to +5° from the energization phase at which the current is minimum when a target torque is generated.

Figure 16:
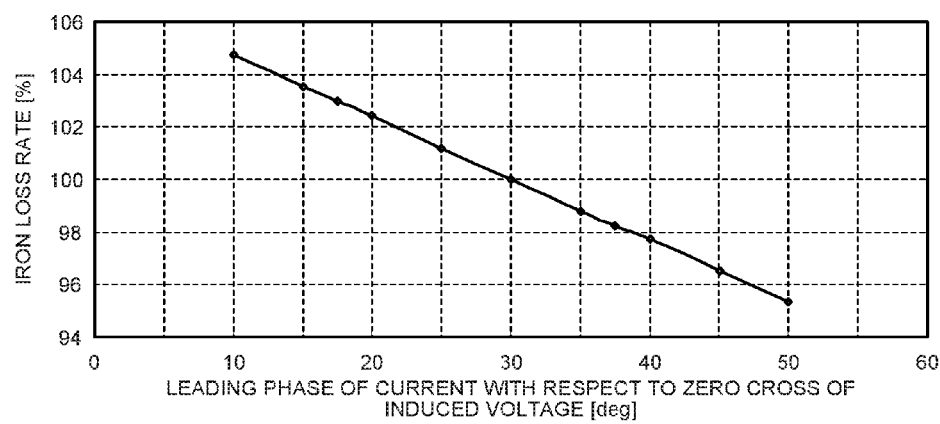
FIG. 16 is a graph illustrating a relationship between the timing of starting the energization with respect to a zero-crossing of an induced voltage and an iron loss generated in a stator core of the synchronous motor according to the first embodiment.

FIG. 16 is a graph illustrating a relationship between the timing of starting the energization with respect to a zero-crossing of an induced voltage and an iron loss generated in a stator core of the synchronous motor according to the first embodiment. In an example illustrated in FIG. 16, the vertical axis indicates an iron loss rate of an iron loss relative to the iron loss generated in a case where the energization is started at the above-described maximum-torque generation phase, that is, at the timing advanced by 30° from the zero-crossing of the induced voltage.

As illustrated in FIG. 16, the iron loss generated in the iron core of the stator 1 is reduced by advancing the timing of starting the energization because the advancement of the timing of starting the energization provides the effect (field weakening effect) of offsetting the magnetic flux, generated from the permanent magnets 6 of the rotor 4, by the magnetic flux generated in the stator winding 3 by causing the square-wave-shaped current to flow, so that the magnetic flux density in the iron core of the stator 1 is reduced to thereby reduce the iron loss generated in the core of the stator 1. Meantime, as described with reference to FIG. 13, when the timing of starting the energization is advanced with respect to the maximum-torque generation phase, the generated torque is reduced. Thus, in order to acquire generated torque similar to that in the maximum-torque generation, it is necessary to increase a current flowing to the stator windings 3 in each phase. In this case, although a copper loss is increased, it is possible to improve efficiency of a synchronous motor by a reduction in an iron loss generated in the iron core of the stator 1 or it is possible to suppress a reduction in efficiency of the synchronous motor by a balance between a copper loss and an iron loss.

As described above, the 120° square-wave drive system operates such that the energization phase at which to pass the current falls within the range of −10° to +5° from the maximum-torque generation phase, i.e., the phase advanced by 30° from the zero-crossing of the induced voltage generated in the stator winding 3 in each phase. In other words, the 120° square-wave drive system operates such that the energization phase at which to pass the current falls within the range of −10° to +5° from the energization phase at current is minimum current when the target torque is generated. This operation of the system enables the low vibration and noise of the synchronous motor. Further, the 120° square-wave drive system operates such that the energization phase at which to pass the current falls within the range of 0° to +5° from the energization phase at which the current is minimum when the target torque is generated. This enables high efficiency of the synchronous motor.

Note that in the present embodiment, as described with reference to FIG. 1, the teeth 2 provided in the stator 1 in such a manner as to face the rotor 4 are formed at the equal angular intervals (a mechanical angle of 40°) in the circumferential direction and face the center axis 10. Thus, when the teeth leading end parts 8 have the uniform widths in the circumferential direction, the slot opening parts 9 between the respective teeth 2 have the uniform widths in the circumferential direction.

Meantime, for improvement of efficiency of the 10-pole 9-slot synchronous motor, it is conceivable that an interval between three teeth in each phase (a mechanical angle of 36°) agrees with the interval between magnetic poles formed by the permanent magnet 6 of the rotor 4 (a mechanical angle of 36°) to logically set a winding factor to 1.000.

Figure 17:
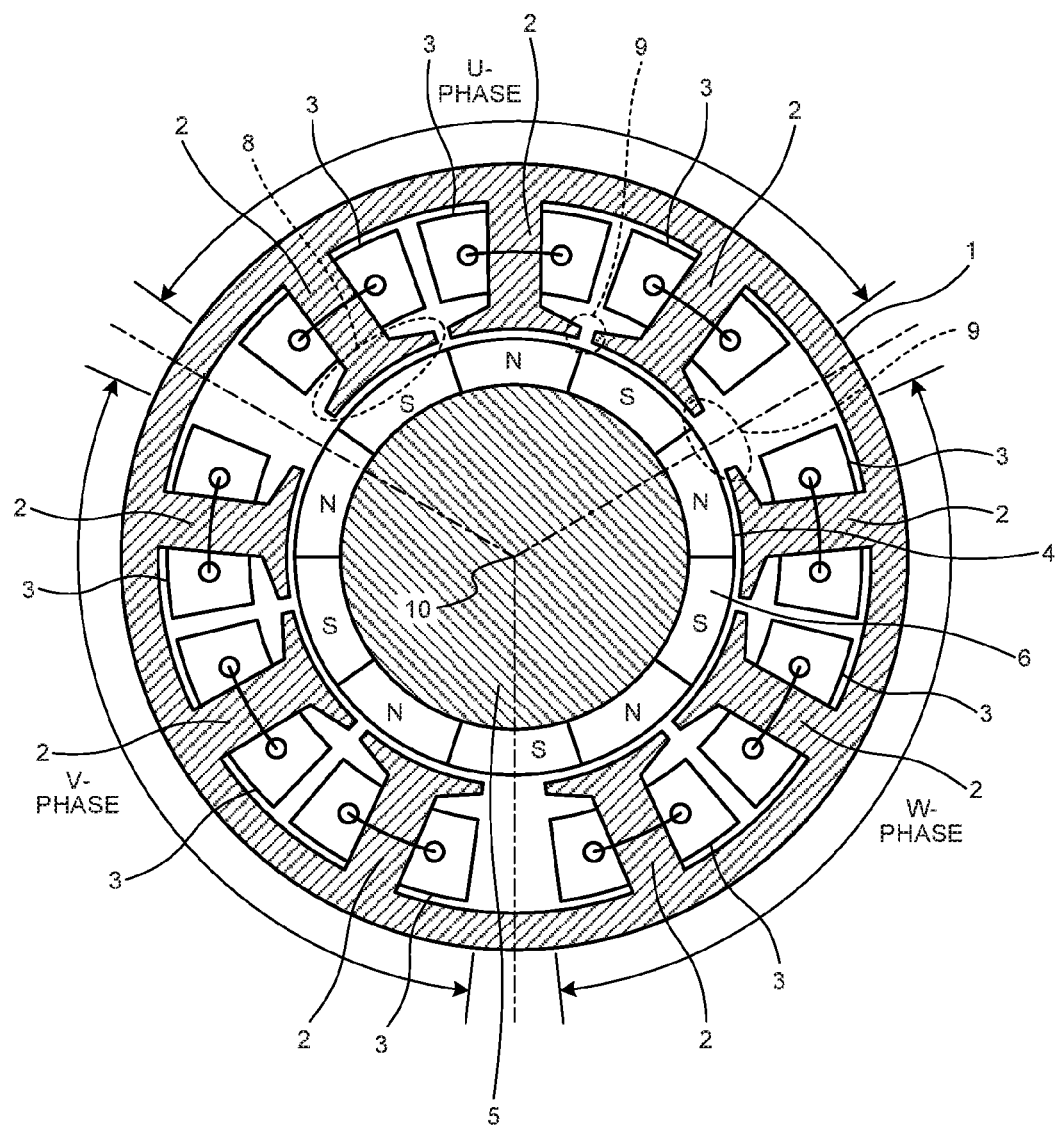
FIG. 17 is a diagram illustrating an example in which three teeth in each phase are formed at equal angular intervals (a mechanical angle of 36°) in the circumferential direction and face toward the center axis, and the middle teeth in the respective phases are formed at equal angular intervals (a mechanical angle of 120°) in the circumferential direction and face toward the shaft center.

FIG. 17 is a diagram illustrating an example in which three teeth in each phase are formed at equal angular intervals (a mechanical angle of 36°) in the circumferential direction and face toward the center axis 10, and the middle teeth in the respective phases are formed at equal angular intervals (a mechanical angle of 120°) in the circumferential direction and face toward the center axis 10.

With a configuration illustrated in FIG. 17, the interval between three teeth in each phase (a mechanical angle of 36°) agrees with the interval between magnetic poles formed by the permanent magnet 6 of the rotor 4 (a mechanical angle of 36°). Thus, logically, it is possible to set a winding factor to 1.000 and it is possible to achieve effective interlinkage of a magnetic flux generated by the permanent magnet 6 of the rotor 4 with the stator windings 3. Thus, it is possible to construct a synchronous motor having the higher efficiency.

Figure 18:
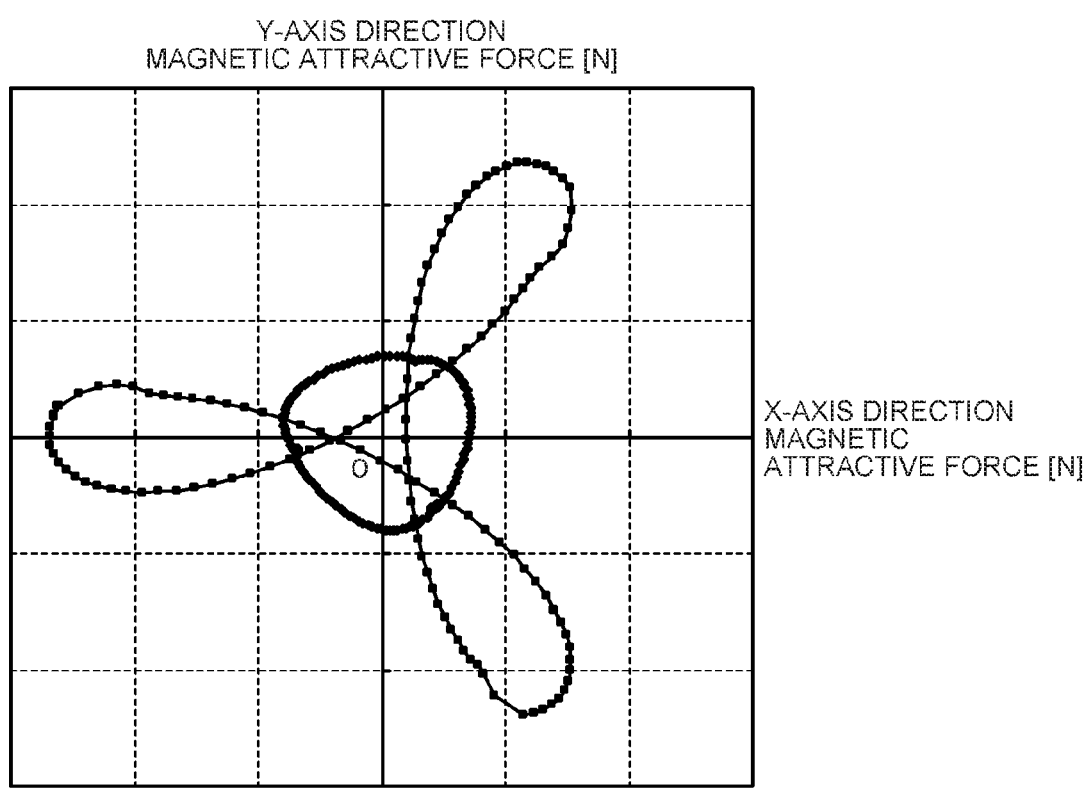
FIG. 18 is a graph illustrating a comparative example of Lissajous curves each of which indicates a trajectory of magnetic attractive force in a radial direction in one cycle of a waveform of flowing current in a case where the synchronous motor illustrated in FIG. 1 according to the first embodiment and the synchronous motor illustrated in FIG. 17 are driven by using the 120° square-wave drive system.

However, as illustrated in FIG. 17, when the teeth leading end parts have uniform widths in the circumferential direction, the slot opening parts 9 between the teeth 2 in the respective phases non-uniform widths in the circumferential direction of the slot opening parts 9. Thus, a balance of the magnetic attractive force generated in the rotor 4 is lost and the radially-directed electromagnetic excitation force is increased. FIG. 18 is a view illustrating a comparative example of Lissajous curves each of which indicates a trajectory of magnetic attractive force in a radial direction in one cycle of a waveform of the flowing current in a case where the synchronous motor illustrated in FIG. 1 according to the first embodiment and the synchronous motor illustrated in FIG. 17 are driven by using the 120° square-wave drive system. In the example illustrated in FIG. 18, the trajectory of magnetic attractive force in the radial direction in the one cycle of the waveform of the flowing current in the 120° square-wave drive system is calculated by a magnetic field analysis.

As illustrated in FIG. 18, the magnetic attractive force in the radial direction (trajectory indicated by dashed line in this figure) of the synchronous motor of the structure illustrated in FIG. 17 does not undergo an abrupt change as found when the 8-pole 9-slot synchronous motor illustrated in FIG. 9 is driven by using the 120° square-wave drive system. However, when compared with the synchronous motor according to the present embodiment, the synchronous motor of FIG. 18 exhibits a larger change in the magnetic attractive force in the radial direction and hence generates a larger electromagnetic excitation force. As a result, it is more likely that a vibration/noise is generated from the body of the synchronous motor. Thus, it is preferable that the teeth 2 provided in the stator 1 in such a manner as to face the rotor 4 are formed at the equal angular intervals (a mechanical angle of 40°) in the circumferential direction and face toward the center axis, and the respective slot opening parts 9 between the teeth 2 have the uniform widths in the circumferential direction.

Note that although the 10-pole 9-slot synchronous motor is driven by the 120° square-wave drive system in the above embodiment, the 10-pole 9-slot synchronous motor can be driven by using, for example, a 180° or another square-wave drive system, which provides the similar effect to the 120° square-wave drive system. It is to be understood that the present invention is not limited by this square-wave drive system.

As described above in relation to the drive circuit for the synchronous motor, the synchronous motor driven by the drive circuit, and the method of driving the synchronous motor in the first embodiment, the 10-pole 9-slot synchronous motor having a relatively high winding factor is driven by using the square-wave drive system, which achieves the low-cost control unit of high efficiency. Since the energization phase at which to pass the square-wave-shaped current is in the range from −10° to +5° in electric angle from the energization phase at which the current is minimum when the target torque is generated, it is possible to suppress the generation of radially-directed electromagnetic excitation force without occurrence of a great variation in the magnetic attractive force at the time of switching between energization and non-energization. As a result, it is possible to suppress vibration/noise generated from the body of the synchronous motor, thus achieving the noise reduction.

For example, unlike a sine-wave drive system that requires complicated control such as vector control, the square-wave drive system is required to configure the control unit using high performance microcomputer or the like. Thus, it is possible to reduce the cost of the control unit. Moreover, the circuit configuration can be simplified and thus the control unit can be reduced in size. Therefore, the system that includes the synchronous motor and the control unit can be reduced in size and cost.

Second Embodiment

FIG. 19 is a diagram illustrating an example of an air blower according to the second embodiment. FIG. 19 illustrates an outdoor unit of an air conditioner as an example of an air blower using the synchronous motor according to the first embodiment. FIG. 19(*a*) is a front view of the outdoor unit of this air conditioner and FIG. 19(*b*) is a cross-sectional view thereof.

As illustrated in FIG. 19, the outdoor unit 500 of the air conditioner includes, as a synchronous motor to drive a fan 501 in a propeller form, a 10-pole 9-slot synchronous motor 502 driven by using the square-wave drive system described in the first embodiment. Also, a vibration-proof member 503 is attached to each of the part where the fan 501 and the output shaft of the synchronous motor 502 are attached and the part where the synchronous motor 502 and the chassis of the outdoor unit 500 are attached.

As described in the first embodiment, since the 10-pole 9-slot synchronous motor 502 has the high winding factor and high efficiency, it is possible to reduce the power consumption of the outdoor unit 500 and the power consumption of the air conditioner.

When the synchronous motor 502 is driven by using the square-wave drive system, torque is reduced at a timing of switching of the current-carrying phase. When this variation of torque (torque ripple) is transmitted to the fan 501, the fan 501 rotates vibrating due to the torque ripple of the synchronous motor 502 and thus a noise is generated. However, in the present embodiment, it is possible to suppress the noise generated from the fan 501 since the vibration-proof structure that attenuates the vibration is provided by the vibration-proof member 503 is attached to the part where the fan 501 and the output shaft of the synchronous motor 502 are attached. Since the vibration-proof structure is provided by the vibration-proof member 503 attached to the part where the synchronous motor 502 and the chassis of the outdoor unit 500 are attached, the vibration that is due to the torque ripple of the synchronous motor 502 and is propagated to the chassis of the outdoor unit 500 can be attenuated to thereby suppress the noise generated from the chassis of the outdoor unit 500.

Also, as described in the first embodiment, when the 10-pole 12-slot or 8-pole 9-slot synchronous motor is driven by using the square-wave drive system, the natural vibration is generated by the large radially-directed electromagnetic excitation force generated due to the abrupt change in magnetic attractive force at the time of switching between energization and non-energization of square-waveform current and no passage of square-waveform current. Due to such natural vibration, a large noise is generated from the body of the synchronous motor. The outdoor unit 500 of the present embodiment uses the 10-pole 9-slot synchronous motor 502 that provides small change in magnetic attractive force at the time of switching between energization and non-energization of square-waveform current when the motor 502 is driven by the square-wave drive system. Also, the energization phase at which to pass the square-wave-shaped current is set in the range from −10° to +5° in electric angle from the energization phase at which the current is minimum when the target torque is generated. Thus, the radially-directed electromagnetic excitation force generated at the time of switching between energization and non-energization can be reduced to thereby suppress a noise generated from the body of the synchronous motor 502.

Also, in order to suppress a noise generated from the body of the 10-pole 12-slot or 8-pole 9-slot synchronous motor, it is necessary to drive the motor by using the sine-wave drive system. However, as described above, in order to achieve a sine-wave drive system, an extremely advanced control technology such as vector control is necessary. Thus, it is necessary to configure a control unit using a microcomputer or the like that can perform advanced waveform generation processing, which leads to an increase in size and cost of the control unit. In the outdoor unit 500 of the present embodiment, the 10-pole 9-slot synchronous motor 502 is used. Thus, even when the motor is driven by using the square-wave drive system, it is possible to suppress a noise generated by the body of the synchronous motor 502 and thus configure an inexpensive control unit compared with a case where the motor is driven by using the sine-wave drive system.

As described above, according to the air blower of the second embodiment, the propeller fan of the outdoor unit of the air conditioner is driven using the high efficient synchronous motor that, as described in the first embodiment, suppresses the vibration/noise due to the radially-directed electromagnetic excitation force when the motor is driven by using the square-wave drive system. Thus, the outdoor unit with a low power consumption and a low noise and the air conditioner including the outdoor unit can be constructed. Moreover, it is possible to reduce the cost and size of the outdoor unit and the air conditioner.

In most cases, a vibration or a noise of an outdoor unit of an air conditioner is generated by a compressor of a refrigerant. Depending on the operation condition, there is a case where the operation frequency of the compressor is reduced or the compressor is stopped. In this case, a vibration or a noise generated by an air blower configured as an outdoor unit may be noticeable. Also, since the output required of an air blower is high compared to an indoor unit, strong electromagnetic excitation force is generated according to the output from a synchronous motor in a case where the electromagnetic excitation force is generated. Thus, when a vibration or a noise is generated by a body of the synchronous motor, there is also a problem in a vibration or a noise of the outdoor unit.

Since the air blower of the present embodiment can suppress a vibration or a noise generated by a body of a synchronous motor, it is possible to construct an air conditioner with a low cost, high efficiency, a low vibration, and a low noise.

Third Embodiment

Figure 20:
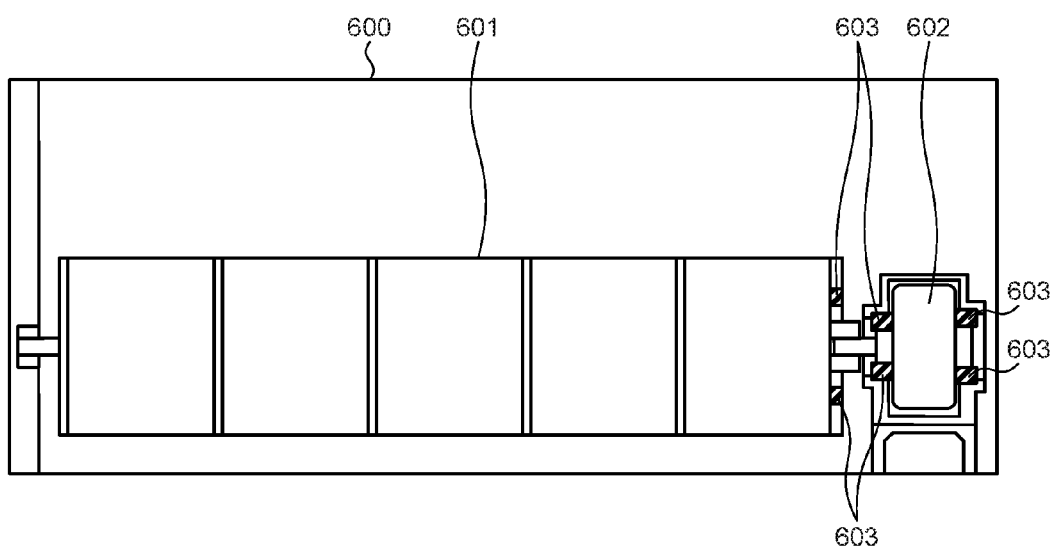
FIG. 20 is a diagram illustrating an example of an air blower according to a third embodiment.

FIG. 20 is a diagram illustrating an example of an air blower according to the third embodiment. FIG. 20 is a front view of an indoor unit of an air conditioner as an example of an air blower using the synchronous motor according to the first embodiment.

In FIG. 20, an indoor unit 600 of an air conditioner includes, as a synchronous motor to drive a fan 601 in a line flow form, a 10-pole 9-slot synchronous motor 602 driven by using the square-wave drive system described in the first embodiment. Also, a vibration-proof member 603 is attached to each of the part where the fan 601 and the output shaft of the synchronous motor 602 are attached and the part where the synchronous motor 602 and the chassis of the indoor unit 600 are attached.

As described in the first embodiment, since the 10-pole 9-slot synchronous motor 602 has a high winding factor and high efficiency, it is possible to reduce the power consumption of the indoor unit 600 and the power consumption of the air conditioner.

In a case where the synchronous motor 602 is driven by using the square-wave drive system, when the torque ripple described in the second embodiment is transmitted to the fan 601, the fan 601 rotates vibrating due to the torque ripple of the synchronous motor 602 and thus a noise is generated. However, in the present embodiment, it is possible to suppress the noise generated from the fan 601 since the vibration-proof structure that attenuates the vibration is provided by the vibration-proof member 603 attached to the part where the fan 601 and the output shaft of the synchronous motor 602 are attached. Also, since the vibration-proof structure is provided by the vibration-proof member 603 attached to the part where the synchronous motor 602 and the chassis of the indoor unit 600 are attached, the vibration that is due to the torque ripple of the synchronous motor 602 and is propagated to the chassis of the indoor unit 600 can be attenuated to thereby suppress the noise generated from the chassis of the indoor unit 600.

Also, as described in the first embodiment, when the 10-pole 12-slot or 8-pole 9-slot synchronous motor is driven by using the square-wave drive system, the natural vibration is generated by the large radially-directed electromagnetic excitation force generated due to the abrupt change in magnetic attractive force at the time of switching between energization and non-energization of square-waveform current. Due to such natural vibration, a large noise is generated from the body of the synchronous motor. The indoor unit 600 of the present embodiment uses the 10-pole 9-slot synchronous motor 602 that provides small change in magnetic attractive force at the time of switching between energization and non-energization of square-wave current when the motor 60 is driven by using the square-wave drive system. Also, the phase at which to pass the square-wave-shaped current is set in the range from −10° to +5° in electric angle from the phase at which to pass the minimum current when the target torque is generated. Thus, the radially-directed electromagnetic excitation force generated at the time of switching between energization and non-energization of square-waveform can be reduced to thereby suppress a noise generated from the body of the synchronous motor 602.

Also, in order to suppress a noise generated from the body of the 10-pole 12-slot or 8-pole 9-slot synchronous motor, it is necessary to drive the motor by using the sine-wave drive system. However, as described above, in order to construct a sine-wave drive system, an extremely advanced control technology such as vector control is necessary. Thus, it is necessary to configure a control unit using a microcomputer or the like that can perform advanced waveform generation processing, which leads to an increase in size and cost of the control unit. In the indoor unit 600 of the present embodiment, the 10-pole 9-slot synchronous motor 602 is used. Thus, even when the motor is driven by using the square-wave drive system, it is possible to suppress a noise generated by the body of the synchronous motor 602 and thus configure an inexpensive control unit compared with a case where the motor is driven by using the sine-wave drive system.

As described above, according to the air blower of the third embodiment, the line-flow fan of the indoor unit of the air conditioner is driven using the high efficient synchronous motor that, as described in the first embodiment, suppresses the vibration/noise due to the radially-directed electromagnetic excitation force when the motor is driven by using the square-wave drive system. Thus, the indoor unit with a low power consumption and a low noise and the air conditioner including the indoor unit can be constructed. Moreover, it is possible to reduce the cost and size of the indoor unit and the air conditioner.

In most cases, a vibration or noise of an indoor unit of an air conditioner is generated by a fan or a synchronous motor. Specifically, an indoor unit of an air conditioner installed inside a room needs to be silent.

Since the air blower of the present embodiment can suppress a vibration or noise generated by a body of a synchronous motor, it is possible to construct the air conditioner with a low cost, high efficiency, a low vibration, and a low noise.

There is a strong demand for size reduction of an indoor unit of an air conditioner. However, it is necessary to place, in a limited space in the indoor unit, a heat exchanger, an air blower, an electric motor, an electric circuit board for control, and the like, all of which are necessary for the air conditioner, the space for the placement of the electric motor and the circuit board is subject to many restrictions. Thus, it is necessary to save space in the indoor unit. Therefore, a drive circuit including the control unit is often installed in a chassis of a synchronous motor.

On the other hand, there is a greater demand for energy-saving in the air conditioner. In order to reduce the power consumption, it is conceivable that a 10-pole 12-slot or 8-pole 9-slot synchronous motor having a high winding factor is mounted. In this case, as described in the first embodiment, a vibration or noise due to the radially-directed electromagnetic excitation force is likely to be generated from the body of the synchronous motor when the motor is driven by using the square-wave drive system. Thus, it is necessary to drive the motor by using the sine-wave drive system, which inevitably increases the cost and size of the drive circuit including the control unit. Also, the drive circuit is not compatible with a product group of cheap edition that is requested to have a low cost rather than saving energy because the cheap product has an 8-pole 12-slot synchronous motor that is typically driven by the square-wave drive system.

Since the synchronous motor described in the first embodiment is driven by using the square-wave drive system, it is possible to achieve both high efficiency and a low noise and secure compatibility of the drive circuit for the synchronous motor between a product group requested to save energy and a product group of cheap edition requested to have a low cost. Thus, the drive circuit can be used in common. In addition, since it is possible to configure a control unit using one inexpensive chip IC or the like and to reduce the size thereof, the installation into a chassis of the synchronous motor is easy.

Also, even in a case where the drive circuit is not installed into a chassis of a synchronous motor, it is possible to reduce the size of the control unit or the circuit board on which the drive circuit including this control unit is mounted.

Note that the configuration described in each of the above embodiments is an example of a configuration of the present invention. It is to be understood that it is possible to make a combination with a different known technology or to modify a configuration within the spirit and the scope of the preset invention, for example, by omitting a part.

INDUSTRIAL APPLICABILITY

As described above, the present invention is useful for a three-phase synchronous motor in which permanent magnets are used in a rotor and is specifically suitable for a configuration of driving a 10-pole 9-slot synchronous motor by using a square-wave system.

The invention claimed is:

1. A drive circuit for a synchronous motor including a rotor having ten magnetic poles formed by a permanent magnet disposed on a surface of the rotor, and a stator in which a winding is wound in a concentrated manner around nine teeth facing the rotor, the drive circuit comprising:
    an inverter including a plurality of switching elements in bridge connection; and
    a control unit that controls the inverter in such a manner that a square-wave-shaped current flows to the winding,
    wherein the control unit operates such that an energization phase at which to pass the current falls within a range of electric angles of −10° to +5° from an energization phase at which the current is minimum when a target torque of the synchronous motor is generated.

2. The drive circuit for a synchronous motor according to claim 1,
    wherein the control unit operates such that an energization phase at which to pass the current falls within a range of electric angles of 0° to +5° from an energization phase at which the current is minimum when a target torque of the synchronous motor is generated.

3. A synchronous motor driven by the drive circuit for a synchronous motor according to claim 1.

4. The synchronous motor according to claim 3, wherein the teeth are formed at equal angular intervals in a circumferential direction thereof and face toward a center axis of the rotor, and
- a plurality of slots are formed between the teeth that are adjacent to each other, the slots having opening parts having uniform widths in a circumferential direction of the opening parts.

5. An air blower comprising:
the synchronous motor according to claim 3.

6. An air conditioner comprising:
the air blower according to claim 5.

* * * * *